(12) United States Patent
Saito et al.

(10) Patent No.: US 8,564,901 B2
(45) Date of Patent: Oct. 22, 2013

(54) DISK DRIVE DEVICE AND METHOD OF PRESS-FITTING WITH REDUCED HUB DEFORMATION

(75) Inventors: Hiroshi Saito, Shizuoka (JP); Kazuhiro Matsuo, Shizuoka (JP)

(73) Assignee: Samsung Electro-Mechanics Japan Advanced Technology Co., Ltd, Shizuoka (JP)

( * ) Notice: Subject to any disclaimer, the term of this patent is extended or adjusted under 35 U.S.C. 154(b) by 208 days.

(21) Appl. No.: 12/616,093

(22) Filed: Nov. 10, 2009

(65) Prior Publication Data

US 2010/0226046 A1    Sep. 9, 2010

(30) Foreign Application Priority Data

Mar. 6, 2009    (JP) .................. 2009-052888

(51) Int. Cl.
*G11B 17/02*    (2006.01)
(52) U.S. Cl.
USPC ........................................ 360/99.08
(58) Field of Classification Search
None
See application file for complete search history.

(56) References Cited

U.S. PATENT DOCUMENTS

| 4,905,110 | A * | 2/1990 | Krum et al. ............... 360/99.08 |
| 6,208,486 | B1 | 3/2001 | Gustafson et al. |
| 2005/0249440 | A1 * | 11/2005 | Yokoo ......................... 384/100 |

FOREIGN PATENT DOCUMENTS

| JP | 2004-251554 | 7/1992 |
| JP | 5-36647 | 5/1993 |
| JP | 5-122879 | 5/1993 |
| JP | 2006-189490 | 8/1994 |
| JP | 09282787 A | 10/1997 |
| JP | 2011-162092 | 6/1999 |
| JP | 2002-233099 | 8/2002 |
| JP | 2003-206943 | 7/2003 |
| JP | 2006-038211 | 9/2006 |

OTHER PUBLICATIONS

Japan Office Action, Jul. 20, 2012, 8 pages.
JPO-Notification fo Reason for Refusal, dated Mar. 15, 2012, App. No. 2009-052888, Dispatch No. 183855.
JPO-Notification of Reason for Refusal, Jun. 5, 2012, 3 pages.

* cited by examiner

*Primary Examiner* — David D Davis
(74) *Attorney, Agent, or Firm* — Fulwider Patton LLP (57) ABSTRACT

In the brushless motor, a hub has a cylindrical separating wall in between a yoke and two magnetic recording disks. The yoke is affixed to the inner surface of the separating wall of the hub using both a press-fit and adhesion. A first convex portion and a second convex portion are formed on the inner surface of the separating wall, and the yoke is pressed against these convex portions in the case where the yoke is press-fit. The first convex portion and the second convex portion are formed in a ring shape around the rotational axis of the motor. The diameter of the first convex portion is less than the diameter of the second convex portion.

12 Claims, 5 Drawing Sheets

DISK DRIVE DEVICE AND METHOD OF PRESS-FITTING WITH REDUCED HUB DEFORMATION

CROSS-REFERENCE TO RELATED APPLICATIONS

This application is based upon and claims the benefit of priority from the prior Japanese Patent Application No. 2009-052888; filed on Mar. 6, 2009, the entire contents of which are incorporated herein by reference.

BACKGROUND OF THE INVENTION

1. Field of the Invention

The present invention relates to a disk drive device for rotating a disk.

2. Description of the Related Art

A hard disk drive is known as a medium used as a storage device in a computer. In a hard disk drive, a magnetic recording disk on which recording tracks are formed is rotated at high speed by a brushless motor. A magnetic head is placed against the surface of the magnetic recording disk with a slight distance between them for the purpose of reading/writing magnetic data contained in the recording tracks.

Japanese Utility Model Application Publication No. hei5-36647 and Japanese Patent Application Publication No. hei5-122879 disclose a type of brushless motor in which a yoke is press-fit against the inside of a hub that holds a magnetic recording disk. In this type of brushless motor, the yoke is press-fit with sufficient strength in order to prevent the yoke from being misaligned or from dropping due to impulse. Here, the press-fit strength means the pressure between the components after they are press-fit against each other.

SUMMARY OF THE INVENTION

If the press-fit strength is large, however, the hub may be deformed. With regard to the rotating apparatus disclosed in Japanese Patent Application Publication No. hei5-122879, it is also necessary to fix the rotor yoke to the rotor hub by press-fitting. Therefore, if the press-fit strength is large, the rotor hub may also be deformed.

If the hub is deformed, it may become difficult to fit the magnetic recording disk to the hub.

The present invention addresses these disadvantages, and a general purpose thereof is to provide a disk drive device that reduces the deformation of the hub, the disk drive device including, for example, a brushless motor in which the yoke is press-fit against the hub.

An embodiment of the present invention relates to a disk drive device. This disk drive device comprises: a hub on which a recording disk is to be mounted; a base rotatably supporting the hub through a bearing unit; a core fixed to the base, the core having a ring portion and a plurality of teeth that extend radially from the ring portion; coils wound around the plurality of teeth; a yoke fixed to the hub; and a magnet fixed to the yoke, the magnet being magnetized for driving with a plurality of poles along the circumferential direction and arranged to radially face the plurality of teeth. The hub has a cylindrical separating wall that is in between the yoke and the recording disk in the case where the recording disk is mounted on the hub. The yoke is fixed to an inner surface of the separating wall using both adhesion and press-fitting.

"A disk drive device" may be a device for driving a recording disk or, more specifically, a brushless motor.

Another embodiment of the present invention is also a disk drive device. This disk drive device comprises: a hub on which a recording disk is to be mounted; a base rotatably supporting the hub through a bearing unit; a core fixed to the base, the core having a ring portion and a plurality of teeth that extend radially from the ring portion; coils wound around the plurality of teeth; and a magnet fixed to the hub, the magnet being magnetized for driving with a plurality of poles along the circumferential direction and arranged to radially face the plurality of teeth. The hub has a convex-shaped portion of which the center is the rotational axis. The recording disk is seated on a seating surface of the convex-shaped portion in the case where the convex-shaped portion is fit into the central hole of the recording disk. A protruding portion for seating the recording disk is formed on the seating surface of the convex-shaped portion. A part of the protruding portion on which the recording disk is seated is a smoothly-curved surface.

A further embodiment of the present invention is also a disk drive device. This disk drive device comprises: a hub on which a recording disk is to be mounted; a base rotatably supporting the hub through a bearing unit; a core fixed to the base, the core having a ring portion and a plurality of teeth that extend radially from the ring portion; coils wound around the plurality of teeth; a yoke fixed to the hub; and a magnet fixed to the yoke, the magnet being magnetized for driving with a plurality of poles along the circumferential direction and arranged to radially face the plurality of teeth. The hub has a cylindrical separating wall that is in between the yoke and the recording disk in the case where the recording disk is mounted on the hub. The yoke is press-fit against an inner surface of the separating wall. An outer surface of the separating wall is processed so that it becomes flat along a rotational axis.

Optional combinations of the aforementioned constituting elements and implementations of the invention in the form of methods, apparatuses, or systems may also be practiced as additional modes of the present invention.

BRIEF DESCRIPTION OF THE DRAWINGS

Embodiments will now be described, by way of example only, with reference to the accompanying drawings, which are meant to be exemplary, not limiting, and wherein like elements are numbered alike in several figures, in which.

DETAILED DESCRIPTION OF THE INVENTION

The invention will now be described by reference to the preferred embodiments. This does not intend to limit the scope of the present invention but to exemplify the invention.

The size of the component in each figure may be changed in order to aid understanding. Some of the components in each figure may be omitted if they are not important for explanation.

Preferably, an embodiment of the present invention is used for a brushless motor that is installed in a hard disk drive and that drives a magnetic recording disk or a disk drive motor that is installed in an optical-disk read/write device such as a CD device or a DVD device. A press-fit surface of a hub that faces a yoke is formed in a concavo-convex form in the brushless motor according to the embodiment of the present invention. The convex portion touches the yoke and applies mechanical pressure to the yoke to fix it. Glue is applied on the concave portion, and the yoke is affixed by the glue. Therefore, the mechanical pressure to be applied to the yoke from the hub can be reduced by an amount corresponding to the strength of the glue, compared with the situation where only the mechanical pressure supplies sufficient strength to fix the yoke to the hub. As a result, it is less likely for the mechanical pressure to deform the hub or the yoke.

The First Embodiment

Figure 1:
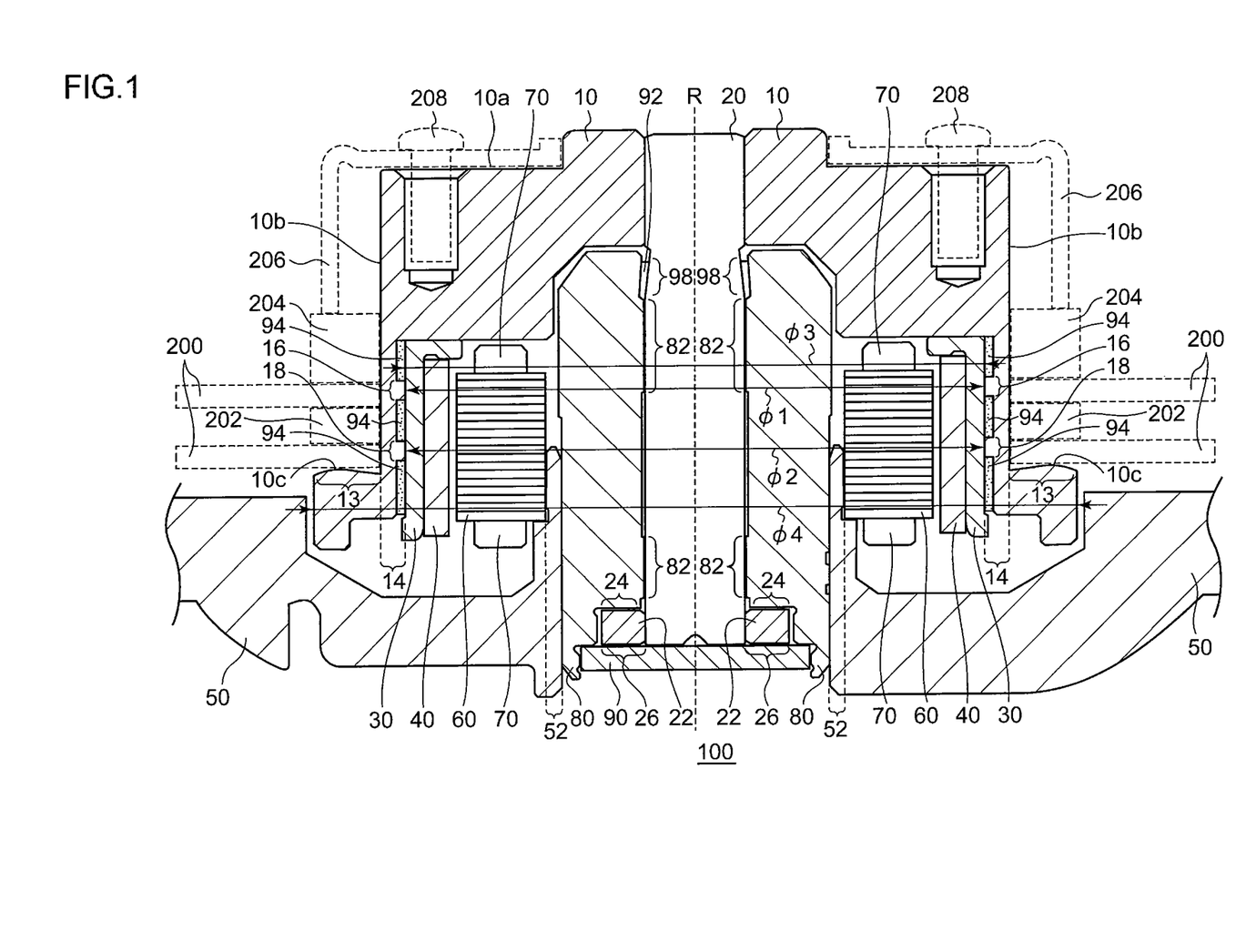
FIG. 1 is a cross section of a brushless motor according to the first embodiment of the present invention.
Figure 2:
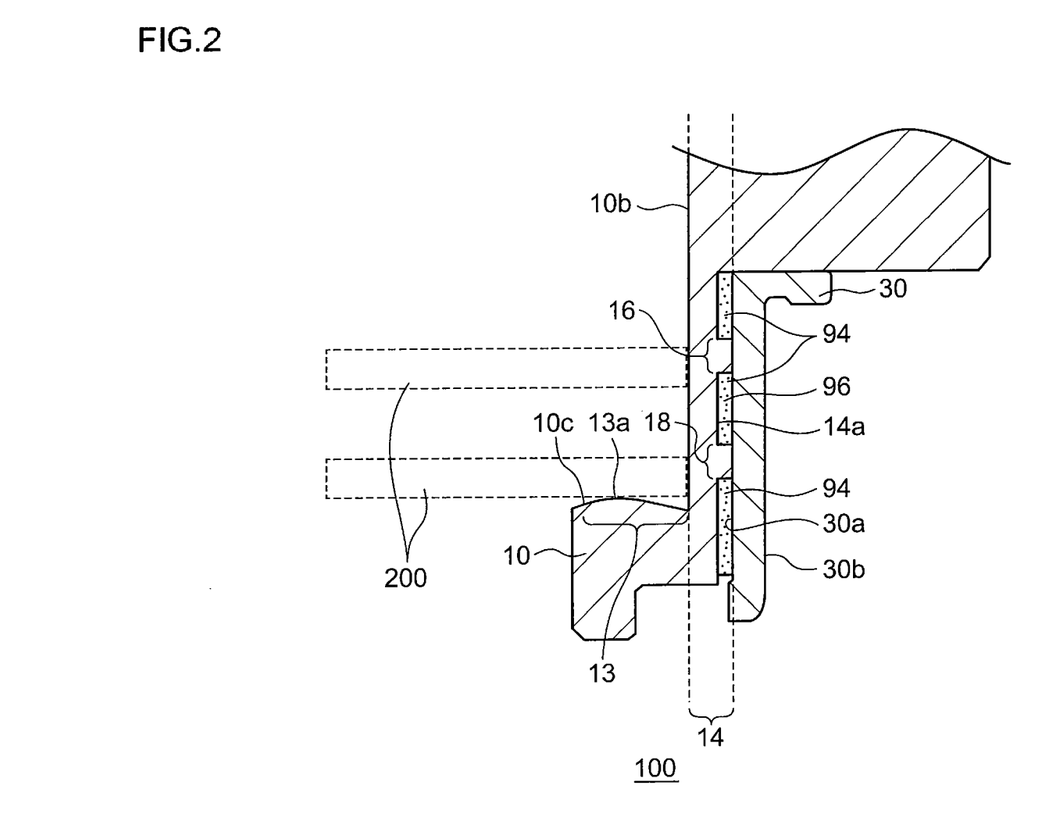
FIG. 2 is a magnified view that magnifies a portion where the hub touches the yoke, in the cross section of the brushless motor in FIG. 1.

FIG. 1 is a cross section of a brushless motor 100 according to the first embodiment of the present invention. FIG. 2 is a magnified view that magnifies the portion where the hub 10 touches the yoke 30, in the cross section of the brushless motor 100 in FIG. 1. FIG. 2 shows the left side of the portion where the hub 10 touches the yoke 30 in FIG. 1. The right side of the portion is arranged in the same manner as in FIG. 2. Hereinafter the structure of the brushless motor 100 is described using FIG. 1 and FIG. 2.

The brushless motor 100 is installed in a hard disk drive and rotates two 3.5 inch-type magnetic recording disks 200 of 95 mm in diameter. Each of the two magnetic recording disks 200 of interest has a central hole of 25 mm in diameter. The thickness of each is 1.27 mm.

The brushless motor 100 comprises a substantially cup-shaped hub 10, a shaft 20, a flange 22, a yoke 30, a cylindrical magnet 40, a base plate 50, a laminated core 60, coils 70, a sleeve 80, a plate 90, lubricant 92, and glue 94. Hereinafter, it is assumed that the side of the base plate 50 on which the hub 10 is installed is the "upper" side.

The hub 10, the shaft 20, the flange 22, the yoke 30, and the cylindrical magnet 40 form a rotor, and these components rotate as a unit around the rotational axis R of the motor when the brushless motor 100 rotates. One end of the shaft 20 is fixed in a hole located at the center of the hub 10 by using both a press-fit and glue. The flange 22 is press-fitted against the other end of the shaft 20.

The hub 10 is formed in a convex form of which the center is the rotational axis R. Hereinafter, it is assumed that the two magnetic recording disks 200 are mounted on the hub 10. An outer-cylindrical surface 10b of the convex portion of the hub 10 is fit into the central holes of the two magnetic recording disks 200. The lower one of the two magnetic recording disks 200 is seated on a seating surface 10c that extends radially from the lower end of the outer-cylindrical surface 10b. The diameter of the outer-cylindrical surface 10b is 25 mm. More precisely, the diameter of the outer-cylindrical surface 10b is 24.978±0.01 mm.

A ring-shaped first spacer 202 is inserted between the two magnetic recording disks 200. A clamper 206 presses the two magnetic recording disks 200 and the first spacer 202 against the hub 10 via a ring-shaped second spacer 204 in order to fix them together. The clamper 206 is affixed to the top surface 10a of the hub 10 by a plurality of clamping screws 208.

The hub 10 has a cylindrical separating wall 14 that is in (or sandwiched) between the yoke 30 and the two magnetic recording disks 200.

The yoke 30 has a reverse L-shaped cross section and is made of a magnetic material such as iron. The yoke 30 is affixed to an inner surface 14a of the separating wall 14 using both adhesion and press-fitting. A first convex portion 16 and a second convex portion 18 are formed on the inner surface 14a of the separating wall 14, and the yoke 30 is pressed against the two convex portions 16, 18 in the case where the yoke 30 is press-fit. Both the first convex portion 16 and the second convex portion 18 are formed in a ring shape around the rotational axis R of the motor. The two convex portions 16, 18 are formed separate along the axial direction so that the first convex portion 16 is formed on the upper side. The two convex portions 16, 18 are formed so that a first diameter φ1 of the first convex portion 16 around the rotational axis R of the motor is less than a second diameter φ2 of the second convex portion 18 around the rotational axis R of the motor.

Glue 94 is filled in between the inner surface 14a of the separating wall 14 and an outer surface 30a of the yoke 30. This is realized by applying a suitable amount of glue on the inner surface 14a of the separating wall 14 before the yoke 30 is press-fit against the hub 10. The outer surface 30a of the yoke 30 is a cylindrical outer surface that faces the inner surface 14a of the separating wall 14. The diameter of the outer surface 30a of the yoke 30 is referred to as a yoke outer diameter φ3.

The space surrounded by the outer surface 30a of the yoke 30, the inner surface 14a of the separating wall 14, the first convex portion 16, and the second convex portion 18 functions as a glue holder 96 that accommodates glue 94. From this space, it is possible to apply a suitable amount of glue 94.

The first convex portion 16 and the second convex portion 18 may be formed so that the glue holder 96 can hold a necessary amount of the glue 94 for acquiring a desired strength of adhesion.

In order to be able to press-fit the yoke 30 against the hub 10, it is at least necessary for the first diameter φ1 of the first convex portion 16 to be less than the yoke outer diameter φ3. A first press-fit allowance δ1 is defined as the resulting value of the subtraction of the first diameter φ1 from the yoke outer diameter φ3 (δ1=φ3−φ1). A second press-fit allowance φ2 is defined as the resulting value of the subtraction of the second diameter φ2 from the yoke outer diameter φ3 (δ2=φ3−φ2). In the present embodiment, since the first diameter φ1 is less (<) than the second diameter φ2, the first press-fit allowance δ1 is greater (>) than the second press-fit allowance δ2. In order to make the press-fit possible, the first press-fit allowance δ1 is greater than zero (>0). The first press-fit allowance δ1 and the second press-fit allowance δ2 can be determined according to experimentation. In the present embodiment, the first convex portion 16 and the second convex portion 18 are formed so that the first press-fit allowance δ1 is greater than or equal to 10 μm and the second press-fit allowance δ2 is less than or equal to 50 μm. Therefore, the first convex portion 16 is responsible for most of the strength of the press-fit.

It is preferred in light of the deformation of the yoke 30 and the precision of mounting the yoke 30 that the first press-fit allowance δ1 (and also, subsequently, the second press-fit allowance δ2) is set to be less than or equal to 100 μm.

The seating surface 10c is described below.

A protruding portion 13 for seating the lower one of the two magnetic recording disks 200 that protrudes upward is formed on the seating surface 10c. The protruding portion 13 is formed in a ring shape around the rotational axis R of the motor. A part of the protruding portion 13 on which the magnetic recording disk is seated is a smoothly-curved surface 13a. The cross-section of the curved surface forms an arc, and its radius is R1. As a result, a portion where the magnetic recording disk touches the seating surface 10c is substantially in a shape of a circle-line.

It is to be noted that the protruding portion 13 is arranged all over the seating surface 10c.

The cylindrical magnet 40 is glued on the inner surface 30b of the yoke 30. The cylindrical magnet 40 is made of a rare-earth material such as Neodymium, Iron, or Boron. The cylindrical magnet 40 faces radially towards twelve teeth of the laminated core 60. The cylindrical magnet 40 is magnetized for driving with P poles (where P is a natural number) along the circumferential direction. It is to be noted that the cylindrical magnet 40 is fixed to the hub 10 through the yoke 30.

The base plate 50, the laminated core 60, the coils 70, the sleeve 80, and the plate 90 form a stator. The stator rotatably supports the rotor when the brushless motor 100 rotates. The base plate 50 is a part of the base of the hard disk drive. The base plate 50 has a cylindrical portion 52 of which the center is the rotational axis R of the motor. The sleeve 80 is glued onto the inner surface of the cylindrical portion 52. The sleeve 80 accommodates the shaft 20. The plate 90 is glued onto the flange 22 side surface of the sleeve 80.

It is to be noted that the base plate 50 may be made separately from the base of the hard disk drive.

The lubricant 92 is injected in a region in between part of the rotor (the shaft 20 and the flange 22) and part of the stator (the sleeve 80 and the plate 90). The shaft 20, the flange 22, the lubricant 92, the sleeve 80, and the plate 90 constitute a bearing unit that rotatably supports the hub 10.

A pair of herringbone-shaped radial dynamic pressure grooves 82 that are vertically separated from each other are formed on the inner surface of the sleeve 80. A first herringbone-shaped thrust dynamic pressure groove 24 is formed on the upper surface of the flange 22. A second herringbone-shaped thrust dynamic pressure groove 26 is formed on the lower surface of the flange 22. The rotor is axially and radially supported by the dynamic pressure generated in the lubricant 92 by these dynamic pressure grooves when the brushless motor 100 rotates.

A capillary seal 98, where the gap between the inner surface of the sleeve 80 and the outer surface of the shaft 20 gradually increases upward, is formed on the opening side of the sleeve 80. The capillary seal 98 prevents the leakage of the lubricant 92 with the capillary effect.

The laminated core 60 has a ring portion and twelve teeth that extend out radially from the ring portion. The laminated core 60 is formed by laminating eighteen thin electro-magnetic steel plates and mechanically integrating them. Each of the coils 70 is wound around one of the twelve teeth, respectively. A driving flux is generated along the teeth by applying a three-phase sinusoidal driving current through the coils 70. The inner surface of the ring portion of the laminated core 60 is fitted to the outer surface of the cylindrical portion 52 with press-fit or clearance fit and glued thereon.

The operation of the brushless motor 100 as described above shall be described below. The three-phase driving current is supplied to the brushless motor 100 to rotate the brushless motor 100. The driving fluxes are generated along the twelve teeth by making the driving current flow through the coils 70. These driving fluxes give torque to the cylindrical magnet 40, and the whole rotor rotates.

Figure 3:
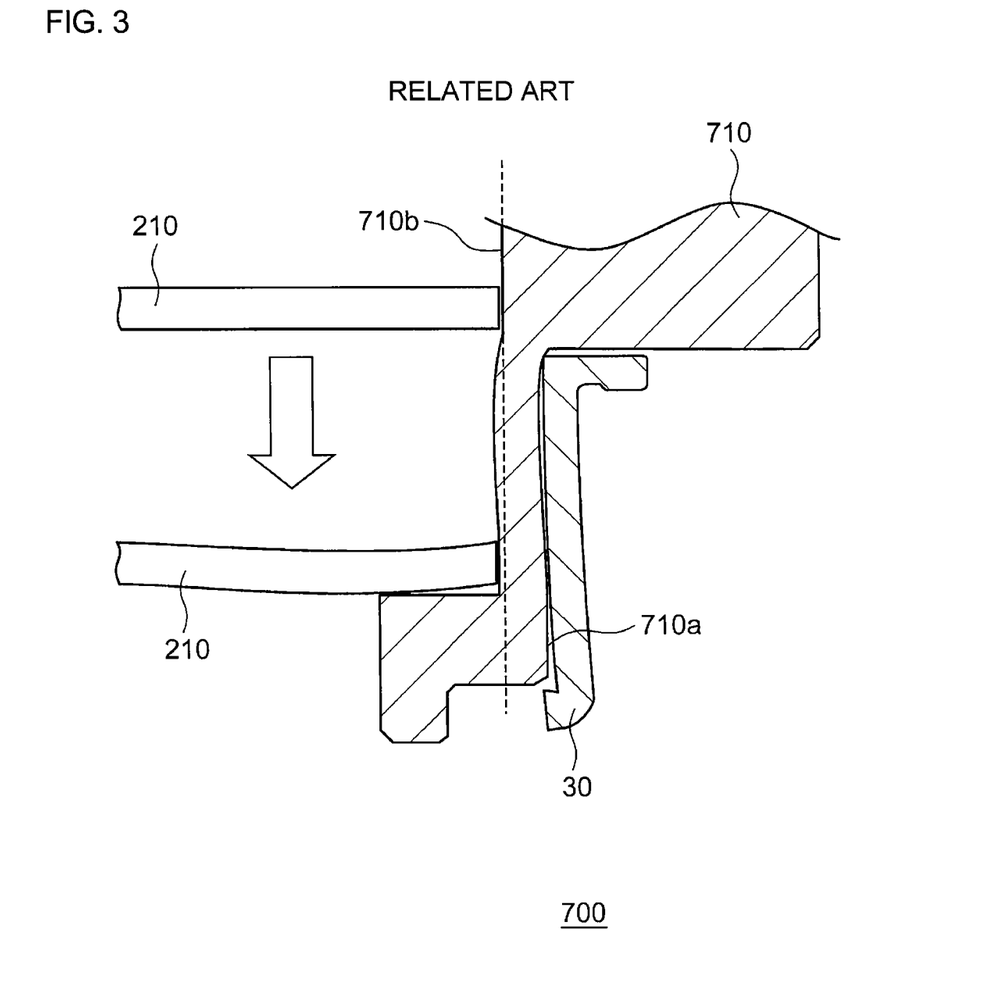
FIG. 3 is a partial cross section showing the procedure in which the magnetic recording disk is fit to the brushless motor according to the first related art.

Described below is the first related art in which the method according to the present embodiment for fixing the yoke 30 to the hub 10 is not used. FIG. 3 is a partial cross section showing the procedure in which the magnetic recording disk 210 is fit to the brushless motor 700 according to the first related art. The cross section shown in FIG. 3 corresponds to FIG. 2. As to the brushless motor 700 according to the first related art, the touching surface 710a of the hub 710 that touches the yoke 30 is flat along the axial direction before the yoke 30 is press-fit. The outer cylindrical surface 710b of the hub 710 fits into the central hole of the magnetic recording disk 210. The yoke 30 is press-fit against the hub 710 without glue. If the press-fit allowance of this press-fit is rather large, it would be possible for the outer cylindrical surface 710b to be deformed or to protrude radially outward, as shown in FIG. 3. It would also be possible for the lower end of the yoke 30 to lean radially inward. This deformation may make it difficult to attach the magnetic recording disk 210 to the hub 710 smoothly. Even if attached, unintended stress may be applied to the magnetic recording disk 210, and the magnetic recording disk 210 may be deformed because of it. Furthermore, it may not be possible to fix the cylindrical magnet 40 as desired due to the deformation of the yoke 30.

This disadvantage is prominent in the situation where the hub has the cylindrical separating wall that is in between the yoke and the magnetic recording disk in the case where the magnetic recording disk is mounted onto the hub or in the situation where the position in the axial direction of the magnetic recording disk after it is mounted overlaps the position in the axial direction of the yoke. This is because, even if the separating wall is deformed by press-fitting the yoke, the magnetic recording disk must be attached through the deformed portion.

In the brushless motor 100 according to the present embodiment, the yoke 30 is affixed to the inner surface 14a of the separating wall 14 using both adhesion and press-fitting. Therefore, the pressure used for the press-fit can be reduced by the amount corresponding to the adhesion strength of the glue. In particular, the press-fit allowance can be reduced. This can reduce the deformation of the hub 10 or the yoke 30 when the yoke 30 is affixed to the hub 10. As a result, the magnetic head can stably trace the recording tracks. Making the recording tracks narrower in order to obtain a high density and a large capacity may not increase the error rate according to the present embodiment. It is also noted that it is possible to precisely attach the cylindrical magnet 40 to the yoke 30.

It could be arranged so that most of the strength for affixing the yoke 30 to the hub 10 comes from the adhesion. In this case, using a press-fit together with glue may make it possible to fix the yoke 30 to the hub 10 temporarily so that the hub 10 does not move relative to the yoke 30 until the glue cures. This can reduce the time to manufacture the brushless motor 100 since, after the step of gluing the yoke 30 to the hub 10, the component can be delivered to the next step even if the glue is not cured yet during the manufacture of the brushless motor 100.

In the case where the brushless motor is to be thinned, the position in the axial direction of the magnetic recording disk tends to overlap the position in the axial direction of the yoke due to its design. In the case where the brushless motor is to be miniaturized, the thickness of the separating wall 14 tends to be rather small. Therefore, in light of the fact that the present situation requires the brushless motor to be thinned and miniaturized, the brushless motor 100 according to the present embodiment provides a preferable solution to the problems accompanied by thinning and miniaturizing.

In the brushless motor 100 according to the present embodiment, the first convex portion 16 and the second convex portion 18 are formed on the inner surface 14a of the separating wall 14, and the yoke 30 is pressed against the two convex portions 16, 18 in the case where the yoke 30 is press-fit. Therefore, a space is generated between the portion of the inner surface 14a of the separating wall 14 other than the two convex portions 16, 18 and the outer surface 30a of the yoke 30. The height of the space corresponds to the height of the convex portions. As a result, a space for holding the glue can be secured between the inner surface 14a of the separating wall 14 and the outer surface 30a of the yoke 30.

Both the first convex portion 16 and the second convex portion 18 are formed in a ring shape around the rotational axis R of the motor. The two convex portions 16, 18 are formed separated along the axial direction so that the first convex portion 16 is formed on the upper side. Therefore, the yoke 30 is hard to lean when the yoke 30 is fixed to the hub 10, thereby the yoke 30 can be precisely positioned in the radial direction.

In the brushless motor 100 according to the present embodiment, the first diameter $\phi 1$ of the first convex portion 16 is less than the second diameter $\phi 2$ of the second convex portion 18. This means that the first press-fit allowance $\delta 1$ is greater (>) than the second press-fit allowance $\delta 2$. Therefore, the pressure in the radial direction that the first convex portion 16 exerts on the yoke 30 is higher than the pressure in the radial direction that the second convex portion 18 exerts on the yoke 30. This design preferably prevents the deformation of the yoke 30 while a press-fit of sufficient strength is obtained. As shown in FIG. 1, the yoke 30 has a reverse L-shaped cross section. The upper side of the reverse L-shape is harder to be deformed by the pressure in the radial direction than the lower side. The endurance against this pressure in the radial direction is referred to as a ring-press-strength. The ring-press-strength of the yoke 30 decreases from top to bottom. Therefore, in the present embodiment, greater pressure in the radial direction is exerted on the upper side where the ring-press-strength is higher; thereby the press-fit strength is obtained. Furthermore, the pressure in the radial direction is suppressed on the lower side where the ring-press-strength is lower; thereby the deformation is suppressed.

In particular, the inventors of the present invention have found, from their experiments, that a press-fit of sufficient strength can be obtained by setting the first press-fit allowance $\delta 1$ to be greater than or equal to 10 μm, and that the deformation of the yoke 30 can be preferably suppressed by setting the second press-fit allowance $\delta 2$ to be less than or equal to 50 μm.

The case where the surface of the hub against which the magnetic recording disk is pressed is flat and therefore the portion where the magnetic recording disk touches the hub is in a plane shape is considered as a second related art. In this case, the magnetic recording disk is affixed to the hub by pressing the magnetic recording disk against the hub using a clamper. The degree of tilt of the magnetic recording disk after mounting is dominated by the degree of tilt of the surface of the hub where the magnetic recording disk touches. Therefore, depending on how much the surface of the hub that touches the magnetic recording disk tilts, the magnetic recording disk may tilt or warp.

In the brushless motor 100 according to the present embodiment, the seating surface 10c includes the protruding portion 13 for seating the magnetic recording disk, and the part of the protruding portion 13 on which the magnetic recording disk is seated is formed to be the smoothly-curved surface. Therefore, the portion where the magnetic recording disk touches the hub 10 is in a shape of a circle-line. This, with the adjustment of forces exerted by the first spacer 202, the second spacer 204, and the clamper 206, can reduce the degree of tilt of the magnetic recording disk in the case where the magnetic recording disk is pressed against the seating surface 10c. As a result, the magnetic head can stably trace the recording tracks. Making the recording tracks narrower in order to obtain a high density and a large capacity may not increase the error rate according to the present embodiment.

In the brushless motor 100 according to the present embodiment, the protruding portion 13 is formed in a ring shape. Therefore, the magnetic recording disk can be precisely positioned in the axial direction.

The Second Embodiment

Figure 4:
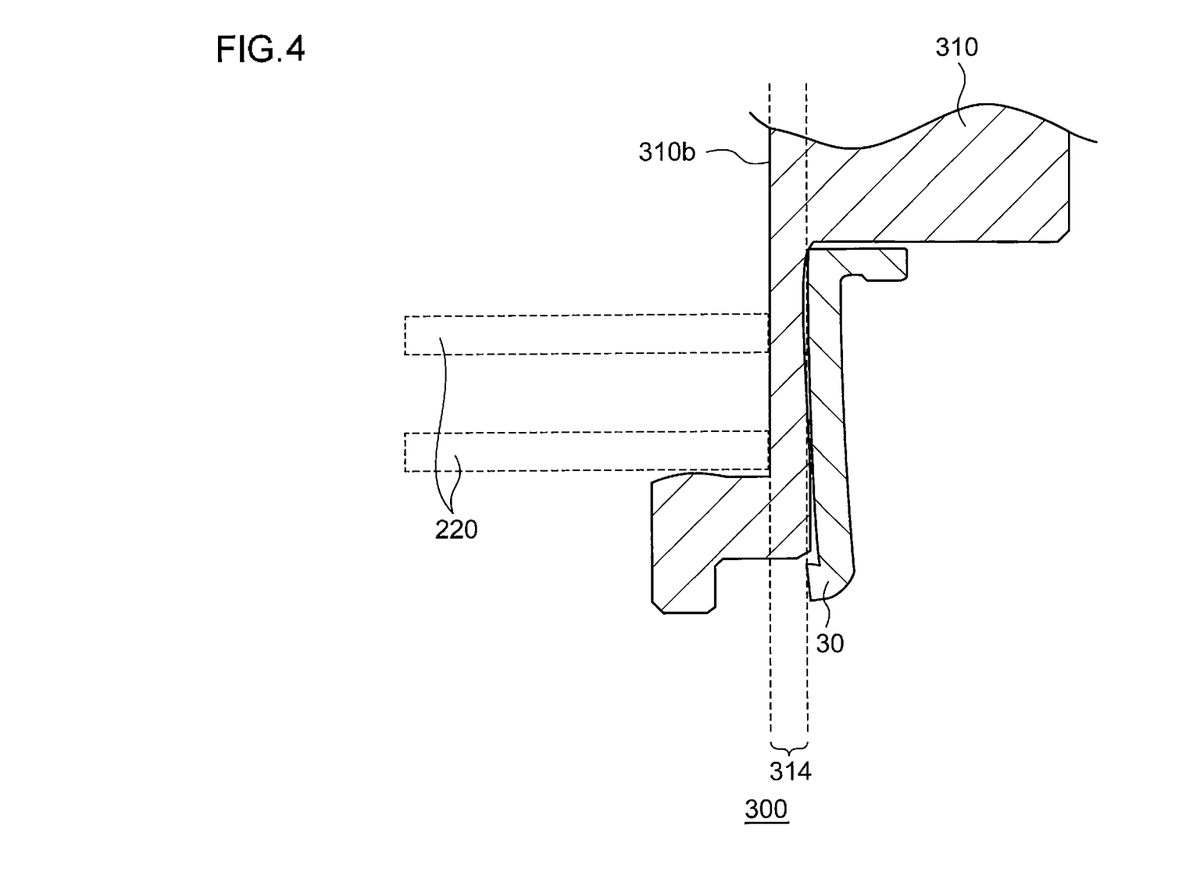
FIG. 4 is a magnified view that magnifies a portion where the hub touches the yoke, in the cross section of the brushless motor according to the second embodiment of the present invention.

The brushless motor 300 according to the second embodiment of the present invention is described in terms of its differences from the brushless motor 100 according to the first embodiment. In the brushless motor 300 according to the second embodiment, instead of forming the first convex portion 16 and the second convex portion 18 on the inner surface 14a of the separating wall 14 as described in the first embodiment, the hub is again processed by cutting after the yoke is press-fit against the hub.

FIG. 4 is a magnified view that magnifies a portion where the hub 310 touches the yoke 30, in the cross section of the brushless motor 300 according to the second embodiment of the present invention. With regard to the brushless motor 300, the hub 310 includes a separating wall 314 that separates the magnetic recording disk 220 and the yoke 30. The yoke 30 is press-fit against the inner surface of the separating wall 314. The outer-cylindrical surface 310b of the separating wall 314 is processed so that it becomes flat along the rotational axis R of the motor.

The hub, before the yoke 30 is press-fit against the hub 310, includes the outer-cylindrical surface to be fit to the magnetic recording disk 220, the diameter of the outer-cylindrical surface being greater than the targeted finishing diameter by 100 μm. If the yoke 30 is press-fit against the hub, the deformation as shown in FIG. 3 may occur. To cope with this, after the press-fit of the yoke 30, the hub 310 is rotated, and the outer-cylindrical surface is processed by cutting in order to obtain the targeted finishing diameter.

This process can make the outer-cylindrical surface 310b flat along the rotational axis R of the motor after completion, even if the outer-cylindrical surface is deformed. As a result, the magnetic recording disk 220 can be precisely mounted on the hub 310.

Preferably, the value (hereinafter referred to as the thickness of cutting), obtained by subtracting the targeted finishing diameter from the diameter of the outer-cylindrical surface of the hub before the yoke 30 is press-fit, is set to be greater than or equal to 20 μm in order to cope with the deformation. It is preferable in terms of work efficiency to set the thickness of cutting less than or equal to 200 μm in order to reduce the time for the cutting process. In particular, the inventors of the present invention have found that it is preferable to set the thickness of cutting between 50 μm and 150 μm.

The torque-ripple and the resonance frequency in the brushless motor 100 according to the first embodiment or the brushless motor 300 according to the second embodiment is described below. It is assumed here that two magnetic recording disks are mounted on the brushless motor.

First, with regard to the torque-ripple, in the brushless motor, the interaction between the magnetic field induced in the coils and the magnetic poles of the cylindrical magnet generates a driving torque. There is torque-ripple in this driving torque. The frequency (hereinafter referred to as a torque-ripple center frequency) of the basic wave of the torque-ripple is proportional to the rotational frequency N (Hz) of the brushless motor and is described in the following Equation 1:

$$3 \times P \times N (\text{Hz}) \quad \text{(Equation 1)}$$

In reality, the interaction is not even in the sense that the driving torque applied to the rotor is not even during one rotation of the rotor. Therefore, the torque-ripple is modulated with the same frequency as the rotational frequency N (Hz). As a result, the torque-ripple includes frequency sideband components as shown in the following Equation 2:

$$3 \times P \times N \pm N = (3 \times P \pm 1) \times N (\text{Hz}) \quad \text{(Equation 2)}$$

Hereinafter the torque-ripple center frequency $3 \times P \times N$ and its two sideband components $(3 \times P \pm 1) \times N$ are considered. These three frequencies are denoted as torque-ripple frequencies.

Second, the resonance is investigated. According to research by the inventors of the present invention, the main elements that determine the Eigen frequency F0 (hereinafter referred to as the Eigen frequency F0) of the second order rocking-mode resonance when not rotating are the stiffness of the bearing, the strength of the connecting portion between the hub and the shaft, the strength of the connecting portion between the magnetic recording disk and the hub, the stiffness of the magnetic recording disk itself, the transverse moment of inertia of the magnetic recording disk, and the transverse moment of inertia of the hub.

According to the inventors of the present invention, the frequency of the second order rocking-mode resonance splits along the rotational direction and against the rotational direction due to the gyro effect as the rotational frequency N (Hz) increases in the case where the magnetic recording disk mounted in the brushless motor rotates. In particular, the amount of the split is ±N (Hz) in the case where the magnetic recording disk rotates with the rotational frequency N (Hz), and two split frequencies of the second order rocking-mode resonance are F0±N (Hz). Therefore, these two split frequencies F0±N (Hz) are matters of interest when it comes to the second order rocking-mode resonance.

The magnetic recording disk vibrates a lot due to resonance if one of the three torque-ripple frequencies described above coincides with either one of the two split frequencies of the resonance. This large vibration may cause the disturbance of the tracing of the recording track and may worsen the error rate of read/write of data, thereby may make it difficult to make the hard disk drive that uses the brushless motor to have a higher density and a larger capacity.

The inventors of the present invention have found that, assuming that the rotational frequency N (Hz) is given, it is possible to realize, by adopting the brushless motor 100 according to the first embodiment or the brushless motor 300 according to the second embodiment, a brushless motor where the Eigen frequency F0 of the second order rocking-mode resonance satisfies the following Equation 3:

$$F0 > (3 \times P + 2) \times N (\text{Hz}) \quad \text{(Equation 3)}$$

The lower one of the two split frequencies of the resonance is higher than the highest one of the three torque-ripple frequencies in the situation where Equation 3 is satisfied. Therefore, the situation where the torque-ripple frequencies coincide with the two split frequencies of the resonance can be avoided. As a result, a large vibration due to the second order rocking-mode resonance can be reduced.

It may be possible that the condition above (Equation 3) is not satisfied because of the change in the resonant frequency caused by a change in temperature, the change in time, a wide range of the precision of the components, or the unevenness in manufacture. To cope with this, it is possible to configure the brushless motor so that it satisfies the condition $F0 > (3 \times P + 3) \times N$, in light of some margin of error. This case is preferred since it is likely to satisfy Equation 3 even if the temperature, etc., changes.

The inventors of the present invention performed the following experiment in order to determine the conditions for the brushless motor 100 according to the first embodiment in order to satisfy Equation 3. It is assumed that two 3.5-inch-type magnetic recording disks 200 of 95 mm in diameter are mounted on the brushless motor 100. Each of these two magnetic recording disks 200 has a central hole of 25 mm in diameter. The thickness of each is 1.27 mm. The cylindrical magnet 40 is magnetized for driving, with P=8 poles along the circumferential direction. The brushless motor 100 rotates with a rotational frequency N of 90 Hz (5400 min-1).

The theoretical minimum of the Eigen frequency F0 that satisfies Equation 3 is 2340 Hz. The experiment revealed that the Eigen frequency F0=2330 Hz where the outer diameter φ4 of the seating surface 10c of the hub 10 was set to be 29 mm, which was 116 percent of the diameter of the central hole of the magnetic recording disk. This value of F0 was less than the theoretical minimum 2340 Hz, so Equation 3 was not satisfied. Then, the outer diameter φ4 was set to be 30 mm, which was 120 percent of the diameter of the central hole of the magnetic recording disk. In this case, the favorable result of the Eigen frequency F0=2400 Hz was obtained. According to these experiments, the brushless motor that can satisfy Equation 3 can be obtained if the seating surface 10c is formed so that the outer diameter φ4 is set to be 1.2 times larger than the diameter of the outer-cylindrical surface 10b that fits into the central hole of the magnetic recording disk (nearly equaling the diameter of the central hole of the magnetic recording disk). The larger the outer diameter φ4 is, the better the result is. However, the case where the seating surface 10c is formed so that the outer diameter φ4 is less than or equal to the value obtained by multiplying the diameter of the central hole of the magnetic recording disk by a factor of 1.5 is preferable in that the region used for recording on the magnetic recording disk can be kept large. In order to realize a brushless motor that satisfies Equation 3 while keeping the region used for recording on the magnetic recording disk large, it is preferable to set the outer diameter φ4 to be 1.25 times to 1.35 times the diameter of the central hole of the magnetic recording disk.

Above is an explanation based on the exemplary embodiment(s). These embodiments are intended to be illustrative only, and it will be obvious to those skilled in the art that various modifications to constituting elements and processes could be developed and that such modifications are also within the scope of the present invention.

The first embodiment of the present invention describes the case where the first convex portion 16 and the second convex portion 18 are formed on the inner surface 14a of the separating wall 14, and both the first convex portion 16 and the second convex portion 18 are formed in a ring shape around the rotational axis R of the motor. However, the present invention is not limited to this. For example, only one convex portion may be formed on the inner surface 14a.

Alternatively, more than three convex portions may be formed on the inner surface 14a. Alternatively, convex portions may be formed at regular intervals on the circumference around the rotational axis R of the motor.

Figure 5:
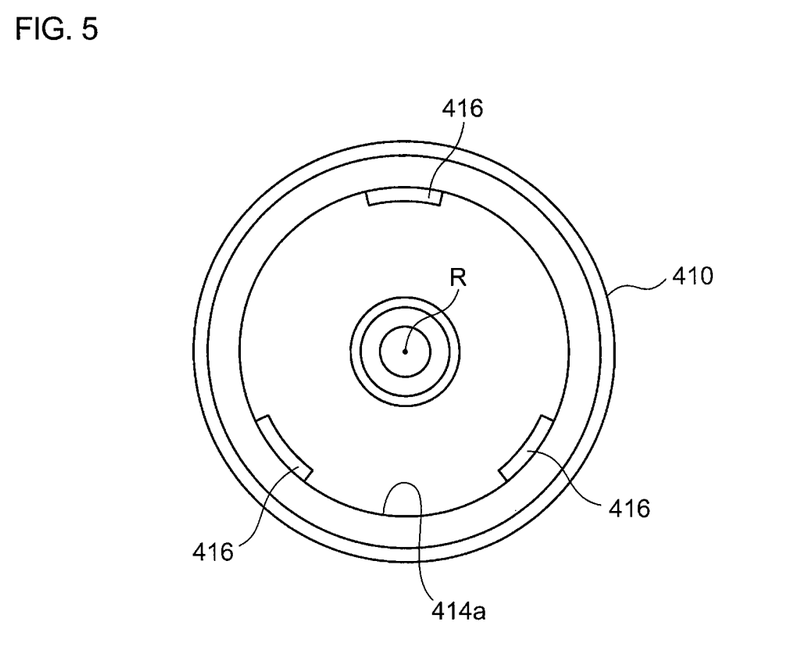
FIG. 5 is a bottom view of the hub of the brushless motor according to the first variation.

FIG. 5 is a bottom view of the hub 410 of the brushless motor according to the first variation. Only the hub 410 is shown in FIG. 5 in order to simplify the description.

Three convex portions 416 are formed on the inner surface 414a of the hub 410, and the yoke 30 is pressed against the three convex portions 416 in the case where the yoke 30 is press-fit against the hub 410. These three convex portions 416 are arranged at regular intervals, or at 120-degree intervals, around the rotational axis R of the motor. In this case, the fine adjustment of the position in the radial direction of the yoke 30 can be easily done by adjusting the thicknesses (in the radial direction) of the three convex portions 416. Furthermore, the space for holding the glue can be made larger compared with the first and second ring-shaped convex portions 16, 18 in the first embodiment.

The first embodiment of the present invention describes the case where the two convex portions 16, 18 are formed so that the first diameter φ1 of the first convex portion 16 is less than the second diameter φ2 of the second convex portion 18. However, the present invention is not limited to this. For example, the first convex portion and the second convex portion may be formed so that the second diameter φ2 is less than the first diameter φ1. In this case, it is preferable that the cross section of the yoke is L-shaped. Alternatively, the first convex portion and the second convex portion may be formed so that the second diameter φ2 is substantially equal to the first diameter φ1.

The first embodiment of the present invention describes the case where the part of the protruding portion 13 on which the magnetic recording disk is seated is a smoothly-curved surface 13a, and the radius of the cross-section of the curved surface is R1. This radius R1 may have its upper limit and lower limit. The lower limit may be set so that the mounted magnetic recording disk can be unstable if the radius R1 becomes smaller than the lower limit. The upper limit may be set so that the portion where the magnetic recording disk touches the seating surface can be in a plane shape when the magnetic recording disk is pressed against the seating surface under a predetermined pressing pressure, if the radius R1 becomes larger than the upper limit.

The first embodiment of the present invention describes the case where the protruding portion 13 is formed in a ring shape around the rotational axis R of the motor. However, the present invention is not limited to this. For example, protruding portions may be arranged on the circumference at regular intervals around the rotational axis R of the motor.

Figure 6:
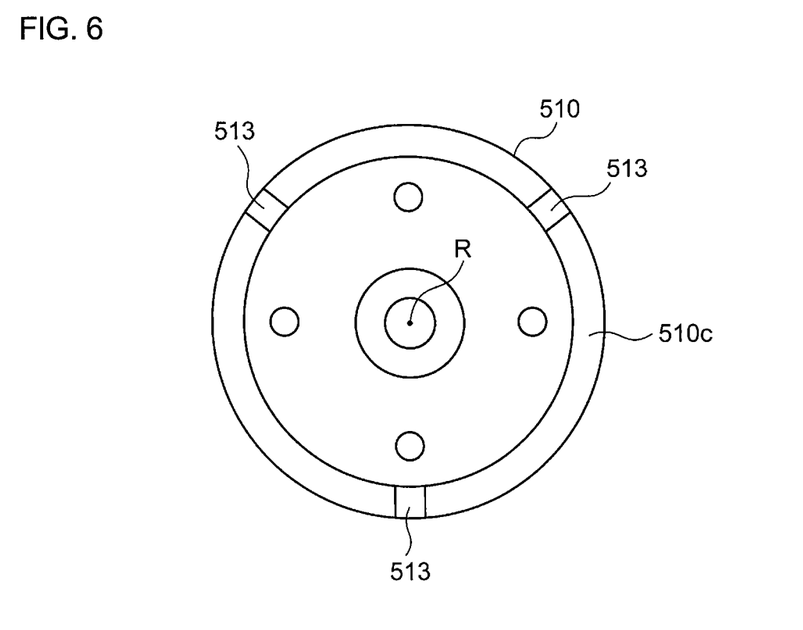
FIG. 6 is a top view of the hub of the brushless motor according to the second variation.

FIG. 6 is a top view of the hub 510 of the brushless motor according to the second variation. Only the hub 510 is shown in FIG. 6 in order to simplify the description. Three protruding portions 513 for seating the magnetic recording disk are formed on the seating surface 510c of the hub 510. Each of the three protruding portions 513 is formed in a half-column shape that traverses the seating surface 510c along the radial direction. These three protruding portions 513 are arranged at regular intervals, or at 120-degree intervals, around the rotational axis R of the motor. In this case, it is possible to support the magnetic recording disk with a more uniform force along the radial direction while the touching portion is in a shape of a line.

In the first embodiment, the surfaces of the first convex portion 16 and the second convex portion 18 that touches the yoke 30 may be made into smoothly-curved surfaces. In this case, the yoke 30 can be fit more smoothly.

The brushless motor 100 according to the first embodiment may have the following parameters:
  First diameter φ1: 22.9 −0.01/−0.04 (mm)
  Second diameter φ2: 22.9 0/−0.02 (mm)
  Yoke outer diameter φ3: 22.9 +0.03/0 (mm)
  Outer diameter φ4: 30.2 ±0.05 (mm)

The second embodiment of the present invention describes the case where the hub 310 is processed by cutting after the yoke 30 is press-fit. However, the present invention is not limited to this. For example, the yoke may be press-fit after cutting the outer-cylindrical surface of the hub in a concave shape. In this case, the coupling portion between the yoke and the hub may not be damaged due to this cutting.

A combination of the first embodiment and the second embodiment, which is the brushless motor where the outer-cylindrical surface of the hub is processed so that it becomes flat along the rotational axis R of the motor after fixing the yoke to the hub using both a press-fit and adhesion, is within the scope of the present invention.

The first and second embodiments of the present invention describe the so-called outer-rotor type of brushless motor in which the magnet is located outside the laminated core. However, the present invention is not limited to this. For example, the present invention may be applied to the so-called inner-rotor type of brushless motor in which the magnet is located inside the laminated core.

The first and second embodiments of the present invention describe the case where the sleeve is fixed to the base plate and the shaft rotates with respect to the sleeve. However, the present invention is not limited to this. For example, the present invention may be applied to a shaft-fixed type of the brushless motor in which the shaft is fixed to the base plate and the sleeve and the hub rotate together with respect to the shaft.

The embodiment describes the case where the laminated core is used. However, the present invention is not limited to this. The core does not have to be a laminated core.

While the preferred embodiments of the present invention have been described using specific terms, such description is for illustrative purposes only, and it is to be understood that changes and variations may be made without departing from the spirit or scope of the appended claims.

In order to make the Eigen frequency F0 of the second order rocking-mode resonance higher than a predetermined reference value, the diameter of the shaft 20 may be set to be greater than or equal to 4 mm. This is preferable since the vibration due to the second order rocking-mode resonance can be suppressed. In the similar manner, in order to make the Eigen frequency F0 of the of the second order rocking-mode resonance higher than a predetermined reference value, the thickness of the recording disk 200 may be set to be greater than or substantially equal to 1.5 mm. This is preferable since the vibration due to the second order rocking-mode resonance can be suppressed.

What is claimed is:
1. A disk drive device, comprising:
  a hub on which a recording disk is to be mounted;
  a base rotatably supporting the hub through a bearing unit;
  a core fixed to the base, the core having a ring portion and a plurality of teeth that extend radially from the ring portion;
  coils wound around the plurality of teeth;
  a yoke fixed to the hub; and
  a magnet fixed to the yoke, the magnet being magnetized for driving with a plurality of poles along the circumferential direction and arranged to radially face the plurality of teeth,
  wherein the hub has a cylindrical separating wall that is in between the yoke and the recording disk in the case where the recording disk is mounted on the hub, and the yoke is fixed to an inner surface of the separating wall using both adhesion and press-fitting, and wherein a convex portion is formed on the inner surface of the separating wall, and the yoke is pressed against the convex portion in the case where the yoke is press-fit, wherein a surface of a central hole of the recording disk faces an outer surface of the yoke in a radial direction in the case where the recording disk is mounted on the hub, and wherein the separating wall intervenes between the surface of the central hole of the recording disk and the outer surface of the yoke, and wherein the convex portion touches the outer surface of the yoke to form a gap between the yoke and the separating wall, and wherein the gap holds glue.

2. The disk drive device according to claim 1, wherein the convex portion is formed in a ring shape around a rotational axis of the hub.

3. The disk drive device according to claim 2, wherein said convex portion formed in a ring shape comprises two ring-shaped convex portions, and wherein the two ring-shaped convex portions are formed on the inner surface of the separating wall, and the two ring-shaped convex portions are formed so that the diameter of one of the two ring-shaped convex portions is less than the diameter of the other.

4. The disk drive device according to claim 3, wherein the yoke is formed so that it is harder for the yoke to be deformed by a pressure in a radial direction on one side of the yoke along the rotational axis of the hub than on the other side, and the two ring-shaped convex portions are formed separated along the rotational axis of the hub and formed so that the diameter of one of the two ring-shaped convex portions that corresponds to one side of the yoke is less than the diameter of the other that corresponds to the other side of the yoke.

5. The disk drive device according to claim 4, wherein the cross-section of the yoke is formed in a reverse L-shape.

6. The disk drive device according to claim 2, wherein said convex portion formed in a ring shape comprises two ring-shaped convex portions, and wherein the two ring-shaped convex portions are formed on the inner surface of the separating wall, and the space surrounded by the yoke, the separating wall, and the two ring-shaped convex portions hold glue for fixing the yoke to the inner surface of the separating wall, the two ring-shaped convex portions formed so that the space holds a necessary amount of the glue for acquiring a desired strength of adhesion.

7. The disk drive device according to claim 1, wherein the coils are three-phase driven, and the magnet is magnetized for driving with P poles, where P is a natural number, along the circumferential direction, and an Eigen frequency F0 satisfies the equation, $$F0 > N \times (3 \times P + 2),$$

where F0 (Hz) is an Eigen frequency of the second order rocking-mode resonance when not rotating in the situation where the recording disk is mounted on the hub and where N (Hz) is the rotational frequency of the hub.

8. The disk drive device according to claim 7, wherein the hub has a convex-shaped portion of which a center is the rotational axis and the recording disk is seated on a seating surface of the convex-shaped portion in the case where the convex-shaped portion is fit into the central hole of the recording disk, and a protruding portion for seating the recording disk is formed on the seating surface of the convex-shaped portion and the outer diameter of the seating surface is set to be 1.2 times to 1.5 times that of the diameter of the central hole of the recording disk so as for the Eigen frequency F0 to satisfy $F0 > N \times (3 \times P + 2)$.

9. A disk drive device, comprising:
a hub on which a recording disk is to be mounted;
a base rotatably supporting the hub through a bearing unit;
a core fixed to the base, the core having a ring portion and a plurality of teeth that extend radially from the ring portion;
coils wound around the plurality of teeth;
a yoke fixed to the hub; and
a magnet fixed to the yoke, the magnet being magnetized for driving with a plurality of poles along the circumferential direction and arranged to radially face the plurality of teeth,
wherein the hub has a cylindrical separating wall that is in between the yoke and the recording disk in the case where the recording disk is mounted on the hub and the yoke is press-fit against an inner surface of the separating wall, and an outer surface of the separating wall is processed so that it becomes flat along a rotational axis, wherein a surface of a central hole of the recording disk faces an outer surface of the yoke in a radial direction in the case where the recording disk is mounted on the hub, and wherein the separating wall intervenes between the surface of the central hole of the recording disk and the outer surface of the yoke, and
wherein, after press-fitting, the outer surface of the separating wall is made flat along the rotational axis by cutting the separating wall, which has protruded radially outward due to the press-fit of the yoke.

10. The disk drive device according to claim 9, wherein the recording disk is mounted on the hub within a predetermined accuracy.

11. The disk drive device according to claim 9, wherein the coils are three-phase driven, and the magnet is magnetized for driving with P poles, where P is a natural number, along the circumferential direction, and an Eigen frequency F0 satisfies the equation, $$F0 > N \times (3 \times P + 2),$$

where F0 (Hz) is an Eigen frequency of the second order rocking-mode resonance when not rotating in the situation where the recording disk is mounted on the hub and where N (Hz) is the rotational frequency of the hub.

12. The disk drive device according to claim 10, wherein the hub has a convex-shaped portion of which a center is the rotational axis and the recording disk is seated on a seating surface of the convex-shaped portion in the case where the convex-shaped portion is fit into the central hole of the recording disk, and a protruding portion for seating the recording disk is formed on the seating surface of the convex-shaped portion and the outer diameter of the seating surface is set to be 1.2 times to 1.5 times that of the diameter of the central hole of the recording disk so as for the Eigen frequency F0 to satisfy $F0 > N \times (3 \times P + 2)$.

* * * * *